Oct. 11, 1932.  H. J. RYAN  1,882,340
ATHLETIC FIELD LINE MARKER
Filed Oct. 12, 1931
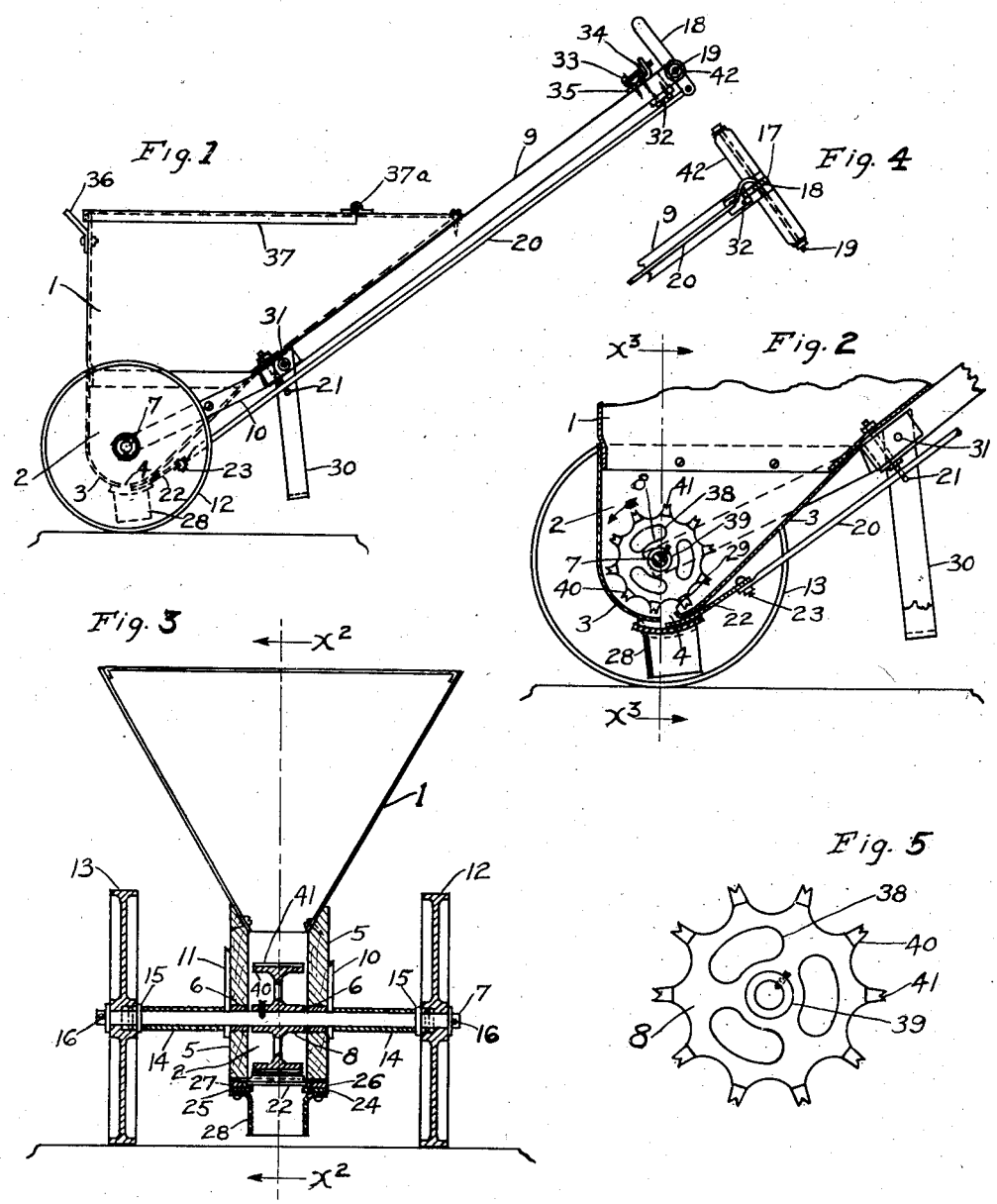
INVENTOR
HERL J. RYAN
by John A. McDowell
his atty.

Patented Oct. 11, 1932

1,882,340

UNITED STATES PATENT OFFICE

HERL J. RYAN, OF LOS ANGELES, CALIFORNIA

ATHLETIC FIELD LINE MARKER

Application filed October 12, 1931. Serial No. 568,254.

This invention relates to a dry lime liner being particularly a machine to be utilized for marking off athletic fields of various kinds, for example, the lanes on racing tracks and the boundary lines of tennis courts.

An object of the invention is to provide a machine of the character referred to which will be easily operated and which will discharge upon the surface desired a continuous and measured amount of dry lime, or other suitable material.

A further object of the invention is to provide a device of such character which may be readily operated to mark out a continuous and unwavering line and which in so doing will discharge the lime at a point immediately above the desired trace.

Other objects, advantages and features of the invention may appear from the accompanying drawing, the subjoined detailed description and the appended claims.

The accompanying drawing illustrates the invention.

Figure 1 is a side elevation of the device in position as in use for marking a field.

Fig. 2 is a fragmental vertical section of the same taken on the line indicated by X2—X2 in Fig. 3 with the feed rotor illustrated in full.

Fig. 3 is a vertical section taken on the line indicated by X3—X3 in Fig. 2.

Fig. 4 is a fragmental bottom plan view of the handle and operating lever and rod.

Fig. 5 is an enlarged detail view of the feed rotor showing the slots therein.

Referring to the drawing there is a containing hopper 1 resting on and fastened to a mixing chamber 2 provided with a vertical front 2a and having no bottom. The mixing chamber 2 has a partially circular bottom 3, which has a slot-like opening 4 extending the full width of the mixing chamber. The sides 5 of the mixing chamber 2 carry bearings 6 in which revolves the shaft 7 to which is fastened the feed rotor 8.

This feed rotor consists of a central web having openings 38 in it and a central hub 39 and around the periphery and equally spaced are arms 40 which extend transversely across the mixing chamber 2 having semi-circular spaces 40a between the arms that permit a majority of lime to fall off the feed rotor and said arms 40 are indented or grooved on the outer sides with grooves 41 which extend the full length of the arms.

Slipped over the shaft and fastened to the sides 5 and to the handle 9 are the handle brackets 10 and 11 that prevent excessive shock to the mixing chamber and tend to hold the axle in alignment. The wheels 12 and 13 are mounted on shaft 7 and are spaced from the sides 5 by means of tube spacers 14 and the thrust is taken by the washers 15. Wheels 12 and 13 are held on the shaft 7 by pins 16 and have a conventional ratchet mechanism which allows them to rotate freely on the shaft in a backward direction, but forces the shaft 7 to turn in the bearings 6 when they are revolved in a forward direction.

At the upper end of the handle 9 is a slot 17 in which rocks an operating lever 18 which is pivoted on the bolt 19 which has a nut 19a that holds the handle grips 42 to the handle. Loosely fastened to the lower arm of the lever 18 is the operating rod 20 which slides in an eyebolt guide 21 that in turn partially holds the hopper 1 to the handle 9. The lower end of the operating rod 20 is fastened to the shut-off plate 22 by a single machine screw 23 in such a manner that a sidewise motion is allowed but not a vertical motion. The shut-off plate 22 is held up against the bottom 3 by the retaining strips 24 and 25 and slides between guide strips 26 and 27 in such a manner as to fully close the slot opening 4 or to close it to any degree desired. Fastened to the retaining strips 26 and 27 is the flexible cup or wind-break 28 which is open at the bottom and on the rear side, and at the rear side of the slot opening 4 is a slight turn-up or projection 29 which just clears the periphery of feed rotor 8.

A foot or rest 30 is fastened to the lower end of handle 9 by means of the bolt 31 which holds the handle brackets 10 and 11 to the handle 9. A stop plate 32 is fastened to the handle 9 on the bottom side and just forward from the operating lever 18 in such a manner as to prevent an excessive forward travel of the operating rod 20 and the shut-off plate 22. On the upper side of the handle 9 is a stop screw 33 with a lock nut 34 turning in a tapped hole in the vertical leg of the stop screw bracket 35 which is fastened to handle 9 just forward from the upper arm of the operating lever 18. This allows the forward throw of the operating lever 18 to be adjusted at will and thus limits the opening of the slot to the desired degree.

Fastened to the forward end of the hopper 1 and in the center is a sight strip 36. Hopper 1 is preferably provided with a cover 37 which is hinged to the top of the hopper as at 37a near the rearward side. In operation a quantity of dry, lumpy or damp lime is placed in the hopper 1 and drops down into the mixing chamber surrounding the rotor 8. The sight strip 36 is then aligned with the desired mark or string and the operator sets the stop screw 33 for the desired amount of opening of slot 4. The operator then pushes the lever 18 forward against the stop screw 33 and propels the machine forward to form the line mark. As the wheels 13 and 14 turn forward the ratchets work and cause shaft 7 to turn in bearings 6 and revolves the feed rotor 8. As the rotor 8 revolves the arms 40 crush the lumps and cause the mixing chamber to be filled with powdery lime. The V-shaped grooves 41 then become filled and packed with lime and since lime adheres to itself in a marked degree, a certain amount of lime will attach itself to that in the slots and will be carried around to the upward projection 29 at the rear side of the slot opening 4, then the lime will be scraped off and the succeeding arms coming around will keep a measured amount of lime forced through the slot-like opening. This will fall on the surface being worked and will be protected from being scattered by the wind-break 28.

When the operator has reached the limit of the line he pulls the lever 18 backward so that the lower arm butts against stop plate 32 and causes the opening 4 to be closed. As he pulls the machine backward the wheels 13 and 14 will rotate freely on the shaft 7 and thus allow the rotor 8 to remain stationary and consequently prevent undue packing of the lime in the mixing chamber when pulling the machine considerable distance to the field to be marked.

The shut-off strip 22 provides a means for regulating the amount of lime to be discharged so that the operator can mark out a thin or a heavy line as he desires. By manipulating the operating rod 20 and the shut-off plate 22, the operator opens or closes the slot 4 as desired.

If the slot 4 is partially closed a portion of the lime will pile up in front of the projection 29 and will be forced upward by the revolving feed rotor arms 40 and into the open space surrounding the rotor hub and will eventually be carried around again by the circular motion so that the feed rotor 8 will not become jammed.

Since the wind-break 28 is made of flexible material the objects or projections which may protrude upward from the surface to be marked will not impede the forward motion of the marker or injure the machine in any way and in addition the downward dropping lime will be protected from the scattering action of the wind.

Attention is directed to the fact that with my invention it is possible to quickly and easily mark a continuous line in any straight or uneven direction as chosen and that said line can be made even though the lime be damp or lumpy and the amount of flow predetermined and regulated at will.

Any marking material in a form similar to lime may be used in my invention and it is in no wise limited to the details of construction heretofore described or illustrated in the drawing, but is of the scope set forth in the appended claims.

I claim:—

1. A device of the character set forth comprising a hopper and a mixing chamber having a vertical front; a feed rotor revolvably mounted in said chamber and provided with a plurality of arms equally spaced having V-shaped grooves on their outer sides that extend the full length of the arms and semi-circular spaces between said arms; a revolvable shaft carried by the chamber and upon which said feed rotor is mounted; wheels mounted on said shaft; a handle fixed to the chamber and provided at its upper end with a slot in which rocks an operating lever on a pivot; retaining strips; guide strips; said chamber having a slot-like opening in its bottom extending the full width of the mixing chamber and a shut-off plate held up against the bottom; by said retaining strips and lever means to operate said shut-off plate between the guide strips to open or close said opening to any degree desired.

2. A device for discharging a continuous and unwavering line of dry lime comprising a chamber having a vertical front; a feed rotor in said chamber provided with a plurality of arms equally spaced having V-shaped grooves on their outer sides that extend the full length of said arms and large semi-circular spaces between said arms; a revolvable shaft carried by the chamber and upon which said feed rotor is mounted; wheels mounted on said shaft; a handle fixed to the chamber and provided at its upper end with a slot in which rocks an operating lever on a pivot; retaining strips; guide strips; said chamber having a slot-like opening in its bottom extending the full width of said chamber; a shut-off plate held up against the bottom by said retaining strips and lever means to operate said shut-off plate between the guide strips as to open or close said opening to any degree desired and a wind-break which will prevent the downward dropping lime from being scattered by the action of the wind.

3. A device of the character set forth having means to discharge upon the surface desired a continuous and unwavering line of lime comprising a hopper having no bottom and its front side being vertical; said hopper resting on and fixed to a mixing chamber provided with a vertical front and a partially circular bottom and a slot like opening extending the full width of the chamber; a revolvable shaft carried in bearings mounted in the sides of said chamber; a feed rotor fixably mounted on said shaft to revolve inside the chamber; said feed rotor comprising a plurality of arms equally spaced having V shaped grooves on their outer sides that extend the full length of the arms and large semi-circular spaces between said arms; wheels mounted on said revolvable shaft; handle brackets slipped over said shaft and fixed to the sides of said chamber and a handle fixed thereto; said handle provided at its upper end with a slot in which rocks an operating lever on a pivot; a machine screw; a shut-off plate up against said bottom of the chamber and means comprising an operating rod which slides in a guide fixed to the handle and one end of said rod being connected to said operating lever and its other end fastened to the shut-off plate by said screw in such a manner that permits a sidewise motion but not a vertical motion to open or close said opening to any degree desired and a wind-break which is open at the bottom and on the rear side that will prevent the downward dropping lime from being scattered by the action of the wind.

4. In a device of the character set forth comprising a hopper resting on and fixed to a mixing chamber having a vertical front; a slot-like opening in the bottom extending the full width of said mixing chamber; a shut-off plate held up against said bottom of the chamber; a revolvable shaft carried in bearings mounted in the sides of said chamber; a feed rotor fixably mounted on said shaft provided with a plurality of arms equally spaced having V shaped grooves on their outer sides that extend the full length of the arms and large semi-circular spaces between said arms; wheels mounted on said revolvable shaft; handle brackets slipped over said shaft and fixed to the sides of said chamber and a handle firmly fixed thereto; said handle provided at its upper end with a slot in which rocks an operating lever pivoted on a bolt upon which is mounted a handle grip on each side of said slot; said bolt being provided with a nut on one end that when tightened forces said handle grips against the slot which squeezes said operating lever holding it locked and holding said shut-off plate to the desired position.

In testimony whereof, I have hereunto set my hand at Los Angeles, California, this 5 day of Oct. 1931.

HERL J. RYAN.